US 11,657,268 B1

(12) United States Patent
Refaat et al.

(10) Patent No.: US 11,657,268 B1
(45) Date of Patent: May 23, 2023

(54) TRAINING NEURAL NETWORKS TO ASSIGN SCORES

(71) Applicant: Waymo LLC, Mountain View, CA (US)

(72) Inventors: Khaled Refaat, Mountain View, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 791 days.

(21) Appl. No.: 16/586,257

(22) Filed: Sep. 27, 2019

(51) Int. Cl.
    *G06N 3/08*     (2023.01)
    *G06N 3/04*     (2023.01)
    *G05D 1/02*     (2020.01)
    *G05D 1/00*     (2006.01)

(52) U.S. Cl.
CPC ............. *G06N 3/08* (2013.01); *G06N 3/04* (2013.01); *G05D 1/0088* (2013.01); *G05D 1/0221* (2013.01); *G05D 2201/0213* (2013.01)

(58) Field of Classification Search
None
See application file for complete search history.

(56) References Cited

U.S. PATENT DOCUMENTS

| 10,839,203 | B1* | 11/2020 | Guigues | ............... G06T 7/277 |
| 2019/0213474 | A1* | 7/2019 | Lin | ............... G06V 40/16 |
| 2020/0065656 | A1* | 2/2020 | Song | ............... G06K 9/6218 |
| 2021/0082128 | A1* | 3/2021 | Okada | ............... G06T 7/248 |

OTHER PUBLICATIONS

Burges et al., "From rank net to lambdarank to lambdamart: an Overview," Microsoft Research Technical Report, Jun. 2010, 19 pages.
Jamieson et al, "Active ranking using pairwise comparisons," NIPS, 2011, 9 pages.

* cited by examiner

Primary Examiner — Jiangeng Sun
(74) *Attorney, Agent, or Firm* — Fish & Richardson P.C.

(57) ABSTRACT

Methods, systems, and apparatus, including computer programs encoded on a computer storage medium, for training a neural network configured to receive a network input and to assign a respective score to each of a plurality of locations in the network input. In one aspect, a method includes obtaining a training input and a corresponding ground truth output; processing the training input to generate a training output; computing a loss for the training input, comprising: selecting a plurality of candidate locations; setting to zero the training scores for any location in the selected candidate locations that has a ground truth score below a threshold value; for each of a plurality of pairs of locations in the selected candidate locations: computing a pair-wise loss for the pair; and combining the pair-wise losses to compute the loss for the training input; and determining an update to the current values of the parameters.

18 Claims, 4 Drawing Sheets

TRAINING NEURAL NETWORKS TO ASSIGN SCORES

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs for training an importance scoring model that can be implemented onboard an autonomous vehicle to assign respective importance scores to agents in a vicinity of the vehicle based on the estimated impacts of the agents on planning decisions generated by a planning subsystem of the vehicle.

In general, one innovative aspect of the subject matter described in this specification can be embodied in methods that include the actions of training a neural network having a plurality of network parameters and configured to receive a network input and to process the network input in accordance with the network parameters to generate a network output that assigns a respective score to each of a plurality of locations in the network input, the method comprising: obtaining a training input and a corresponding ground truth output that assigns a respective ground truth score for each of the plurality of locations in the training input; processing the training input using the neural network and in accordance with current values of the network parameters to generate a training output that assigns a respective training score to each of the plurality of locations in the training input; computing a loss for the training input, comprising: selecting a plurality of candidate locations from the plurality of locations; setting to zero the training scores for any location in the selected candidate locations that has a ground truth score below a threshold value; for each of a plurality of pairs of locations in the selected candidate locations: computing a pair-wise loss for the pair based on the ground truth scores and the training scores for the pair of locations; and combining the pair-wise losses for the pairs of locations to compute the loss for the training input; and determining an update to the current values of the parameters by determining a gradient of the loss with respect to the network parameters. Other embodiments of this aspect include corresponding systems, apparatus, and computer programs, configured to perform the actions of the methods, encoded on computer storage devices.

In some implementations, the method further includes, if (i) a first training score at a first location in the pair is greater than a second training scores at a second location in the pair and (ii) a first ground truth score at the first location in the pair is greater than a second ground truth score at the second location in the pair, then the pair-wise loss is smaller in magnitude than if the first ground truth score at the first location in the pair were less than the second ground truth score at the second location in the pair.

In some implementations, the method further includes, if (i) the first training score at the first location in the pair is greater than the second training score at the second location in the pair but (ii) the first ground truth score at the first location in the pair is less than the second ground truth score at the second location in the pair, then the pair-wise loss is greater in magnitude than if the first ground truth score at the first location in the pair were greater than the second ground truth score at the second location in the pair.

In some implementations, the last layer of the neural network is a layer that is configured to only generate output scores that are greater than or equal to zero.

In some implementations, the plurality of locations in the ground truth output include corresponding locations of one or more agents that are in an environment within the vicinity of a vehicle, and the assigned ground truth scores include respective importance scores for each of the one or more agents.

In some implementations, the importance score for an agent characterizes an estimated impact of the agent on planning decisions generated by a planning subsystem of the vehicle which plans a future trajectory of the vehicle.

In some implementations, combining the pair-wise losses includes computing a sum of all pair-wise losses and computing an average of all pair-wise losses.

In some implementations, selecting a plurality of candidate locations includes selecting a fixed size subset of candidate locations that have the highest ground truth scores.

In some implementations, the plurality of pairs of locations includes all possible pairs of two different selected candidate locations.

Particular embodiments of the subject matter described in this specification can be implemented so as to realize one or more of the following advantages.

Autonomous vehicles navigating through an environment may use an importance scoring model to assign respective importance scores to the agents in a vicinity of the vehicle. The agents may be, for example, pedestrians, bicyclists, or other vehicles. The respective importance scores characterize a relative impact of each agent on planned trajectories generated by a planning subsystem of the vehicle. Based on the importance scores, or, more precisely, the importance ranking of the agents that is derived from the importance scores, prediction of various agent attributes (e.g., agent behaviors, semantics, and classifications) can then be based mostly on the high impact agents in order to efficiently make use of the limited amount of computational resources available on-board the vehicle. However, it is difficult to effectively train such importance scoring models using conventional machine learning training techniques, i.e., based on minimizing errors that are computed as corresponding differences between the training and ground truth labels. For example, some errors might be more important than others. In particular, a larger error should be determined if the relative order of training importance scores assigned to a pair of agents violates the relative order of the ground truth importance labels assigned to the same pair of agents. Evaluating the errors have further difficulties. The first is that many locations in the output correspond to background positions in the environment and importance scores assigned to these locations are typically less relevant and can take arbitrary values. The second is that existing techniques of computing pair-wise losses between all possible pairs of locations in the training and ground truth outputs may require substantial computational resources (e.g., memory, computing power, or both). This specification, however, describes techniques for training an importance scoring model that overcome the above problems. In particular, by considering only a threshold number of locations that have the highest ground truth importance scores, the described techniques focus on training the model to generate accurate importance scores for locations that are likely to correspond to agents instead of background positions in the environment. Moreover, by setting the training importance scores for certain locations that correspond to background positions in the environment to zero before computing the loss, the described techniques prevent any loss computations related to such locations from affecting the training process. In general, more focused training objectives like these can lead to more accurate agent importance estimation and shortened model training time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates example training outputs and example ground truth outputs.
Like reference numbers and designations in the various drawings indicate like elements.

DETAILED DESCRIPTION

This specification describes how to train an importance scoring model implemented onboard a vehicle to determine respective importance scores for agents in the vicinity of the vehicle. The importance score for an agent characterizes an estimated relative impact of the agent on planning decisions generated by a planning subsystem of the vehicle which plans the future trajectory of the vehicle. To enable the importance scoring model to accurately assign importance scores to agents, a training engine trains the model based on optimizing an objective function which is defined as a pair-wise loss function. These features and other features are described in more detail below.

Figure 1:
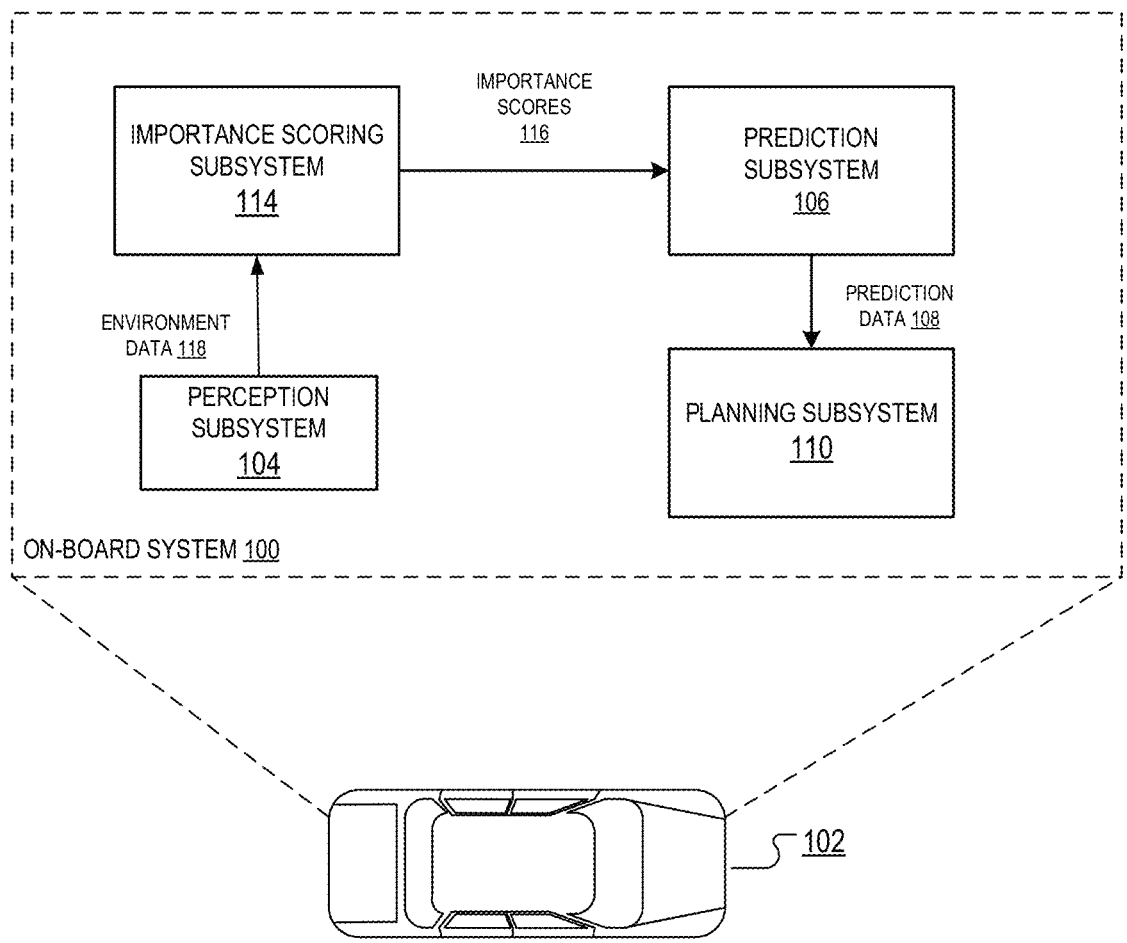
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to control the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a control subsystem or a user interface subsystem).

The on-board system 100 includes a perception subsystem 104 which enables the on-board system 100 to "see" the environment in the vicinity of the vehicle 102. More specifically, the perception subsystem 104 includes one or more sensors, some of which are configured to receive reflections of electromagnetic radiation from the environment in the vicinity of the vehicle 102. For example, the perception subsystem 104 can include one or more laser sensors (e.g., LIDAR sensors) that are configured to detect reflections of laser light. As another example, the perception subsystem 104 can include one or more radar sensors that are configured to detect reflections of radio waves. As another example, the perception subsystem 104 can include one or more camera sensors that are configured to detect reflections of visible light.

The perception subsystem 104 continually (i.e., at each of multiple time points) captures raw sensor data which can indicate the directions, intensities, and distances travelled by reflected radiation. For example, a sensor in the perception subsystem 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. At any given time point, based on processing the raw sensor data, the perception subsystem 104 may perceive that one or more agents are located in the environment in the vicinity of the vehicle 102. The agents in the vicinity of the vehicle 102 may be, for example, pedestrians, bicyclists, or other vehicles.

The on-board system 100 can use the raw sensor data that is continually generated by the perception subsystem 104 to continually generate environment data 118 characterizing a scene of the environment in the vicinity of the vehicle 102. In particular, the environment data 118 includes data describing the agents that are present in the environment.

In some implementations, each environment data 118 includes 200-pixel by 200-pixel top-down images. Each pixel in turn corresponds to a 40-centimeter by 40-centimeter spatial position (which is in some cases occupied by an agent) in the environment.

In some other implementations, each environment data 118 includes respective representations of the trajectories of the agents. Depending on the amount of information that is available in the raw sensor data, respective agent trajectories can be represented up to either a current time point, or a time point in the near future based on some motion estimation. The trajectory of an agent refers to data defining, for each of multiple time points, the spatial position occupied by the agent in the environment at the time point and characteristics of the motion of the agent at the time point. The characteristics of the motion of an agent at a time point can include, for example, the velocity of the agent (e.g., measured in miles per hour–mph), the acceleration of the agent (e.g., measured in feet per second squared), and the heading of the agent (e.g., measured in degrees). The heading of an agent refers to either the direction of travel or the facing orientation of the agent and can be expressed as angular data (e.g., in the range 0 degrees to 360 degrees) which is defined relative to a given frame of reference in the environment (e.g., a North-South-East-West frame of reference).

In such implementations, to represent the trajectory of an agent, the environment data 118 is composed of one or more "channels" that each represent a particular attribute of the agent. The channels may include, for example, time channel and various motion parameter channels. Each channel is a two-dimensional (2D) array of data values that represents a "top-down" perspective of the environment in the vicinity of the vehicle. Each position in each channel corresponds to a respective spatial position in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same spatial position in the environment. In other words, corresponding positions in different channels correspond to the same spatial position in the environment. Specifically, the time channel represents the respective time points at which the agent occupies different spatial positions in the environment. Each motion parameter channel represents the values of the respective motion parameter characterizing the motion of the agent when the agent occupies different spatial positions in the environment. In particular, for each spatial position in the environment which is occupied by the agent, the data value in the time channel which corresponds to the spatial position defines the time point at which the agent occupies the spatial position. Moreover, the data value in each respective motion parameter channel which corresponds to the spatial position defines the respective motion parameter of the agent characterizing the motion of the agent when the agent occupies the spatial position in the environment.

Generally, the environment may include multiple spatial positions which are not included in the trajectory of the agent, i.e., the spatial positions that correspond to the background positions in the environment. For these spatial positions, the system can set the data values in the time channel and the motion parameter channels which correspond to these spatial positions to a default value (e.g., the value 0).

In some implementations, the on-board system 100 can provide the environment data 118 to a prediction subsystem 106. In particular, the on-board system 100 uses the prediction subsystem 106 to continually (i.e., at each of multiple time points) generate prediction data 108 which characterizes some or all of the agents in the vicinity of the vehicle 102. For example, for each of multiple agents in the vicinity of the vehicle 102, the prediction data 108 may be behavior prediction data which generates possible trajectories, defines respective probabilities that the agent makes each of a possible set of intents (e.g., yielding, changing lanes, passing, braking, or accelerating), or both. As another example, for each of the multiple agents in the vicinity of the vehicle 102, the prediction data 108 may be classification prediction data which defines respective probabilities that the agent is each of a predetermined number of possible agent types (e.g., school bus, ambulance, policy officer, construction worker, etc.). As yet another example, for each of the multiple agents in the vicinity of the vehicle 102, the prediction data 108 may be semantic prediction data which includes action recognition of the agent (e.g., riding scooter/skateboard, directing traffic, etc.).

The on-board system 100 can provide the prediction data 108 generated by the prediction subsystem 106 to a planning subsystem 110.

When the planning subsystem 110 receives the prediction data 108, the planning subsystem 110 can use the prediction data 108 to generate planning decisions which plan the future trajectory of the vehicle 102. The planning decisions generated by the planning system 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning subsystem 110 with prediction data 108 indicating that the future trajectory of another vehicle is likely to cross the future trajectory of the vehicle 102, potentially resulting in a collision. In this example, the planning subsystem 110 can generate a planning decision to apply the brakes of the vehicle 102 to avoid a collision.

Optionally, the on-board system 100 then provides the planning decisions generated by the planning subsystem 110 to a control subsystem (not shown in the figure) which controls some or all of the operations of the vehicle 102 based on implementing the planning decisions. For example, in response to receiving a planning decision to apply the brakes of the vehicle, the control subsystem of the vehicle 102 may transmit an electronic signal to a braking control unit of the vehicle. In response to receiving the electronic signal, the braking control unit can mechanically apply the brakes of the vehicle.

In order for the planning subsystem 110 to generate planning decisions which cause the vehicle 102 to travel along a safe and comfortable trajectory, the on-board system 100 must provide the planning subsystem 110 with timely and accurate prediction data 108. However, the prediction subsystem 106 may require substantial computational resources (e.g., memory, computing power, or both) to generate prediction data 108 for an agent in the vicinity of the vehicle. In certain situations, a large number of other agents in the environment may be in the vicinity of the vehicle 102 (e.g., when the vehicle 102 is traveling along a busy highway or a complex urban scenario). In these situations, the limited computational resources available on-board the vehicle 102 may be insufficient for the prediction subsystem 106 to generate timely prediction data 108 for all the agents in the vicinity of the vehicle 102.

To enable the prediction subsystem 106 to generate timely prediction data 108, the on-board system 100 can identify one or more of the agents in the vicinity of the vehicle 102 as "high impact" agents. In some cases, the on-board system 100 identifies only a fraction of the agents in the vicinity of the vehicle 102 as high-impact agents. The prediction subsystem 106 is then configured to generate precise prediction data 108 for the high-impact agents using a prediction model (e.g., a prediction neural network). The prediction subsystem 106 can generate prediction data 108 for any remaining agents which are not identified as high-impact agents, and which will be referred to in this specification as "low impact" agents, using less computationally intensive (but potentially less precise) prediction models. In this specification, a "prediction model" should be understood as implementing a prediction algorithm.

Specifically, the on-board system 100 determines which of the agents in the vicinity of the vehicle 102 to designate as high-impact agents using an importance scoring subsystem 114. The importance scoring subsystem 114 implements an importance scoring model that is configured to assign a respective importance score 116 to each agent in the vicinity of the vehicle 102. The importance score 116 for an agent characterizes an estimated relative impact of the agent on planning decisions generated by a planning subsystem of the vehicle 102. Accordingly, the on-board system 100 identifies the agents with high importance scores as "high impact" agents. That is, the on-board system 100 ranks the agents in descending order of their respective importance scores 116 and identifies the top one or more agents as "high impact" agents.

The on-board system 100 then provides the environment data 118 together with importance scores 116 to the prediction subsystem 106.

After receiving the importance scores 116 that are assigned to the agents in the vicinity of the vehicle 102, the on-board system 100 can concentrate its limited computational resources on generating precise prediction data 108 for only those agents which are likely to have the biggest impact on the planning decisions generated by the planning subsystem 110. In this manner, the on-board system 100 can generate timely prediction data 108 which enables the planning subsystem 110 to generate planning decisions that cause the vehicle to travel along a safe and comfortable trajectory despite the limited computational resources available on-board the vehicle 102.

In a particular example, the importance scoring subsystem 114 implements an importance scoring model that is configured as a neural network. In brief, the neural network is a deep network with multiple network layers, including convolutional layers, max pooling layers, fully connected layers, and transposed convolutional layers. In some implementations, the last layer of the neural network is a layer that is configured to only generate output importance scores that are greater than or equal to zero. Such layer can be, for example, a ReLU activation layer or a sigmoid activation layer.

The network is configured to receive a network input and to process the network input in accordance with the network parameters to generate a network output that assigns a corresponding importance score to each agent in the vicinity of the vehicle 102. In general, the network input includes a two-dimensional array of data values, e.g., environment data 118, which characterizes a scene of the environment in the vicinity of the vehicle 102 including the agents. Techniques for training the neural network will be described in more detail below.

It should be noted that, while the description in this specification largely relates to training a neural network, the training technique can be similarly applied to any other trainable machine learning models, e.g., a random forest model, a support vector machine (SVM) model, and so on.

It should also be noted that a machine learning model appropriately trained using the disclosed training technique can perform any of a variety of machine learning tasks that involve assigning scores to various locations included in task inputs. For example, the task can be an image segmentation task specifying that a machine learning model should partition an input image into multiple segments. Accordingly, the model can perform the task by assigning a score to every pixel in the input image such that the pixels with the same scores share certain characteristics, e.g., belong to the same object, have similar colors, etc. As another example, the task can be a ranking task specifying that a machine learning model should arrange multiple random input items into an ordered list in accordance with certain rules. The model can perform the task by assigning a score to each input item indicating a predicted position for the item in the ordered list.

Figure 2:
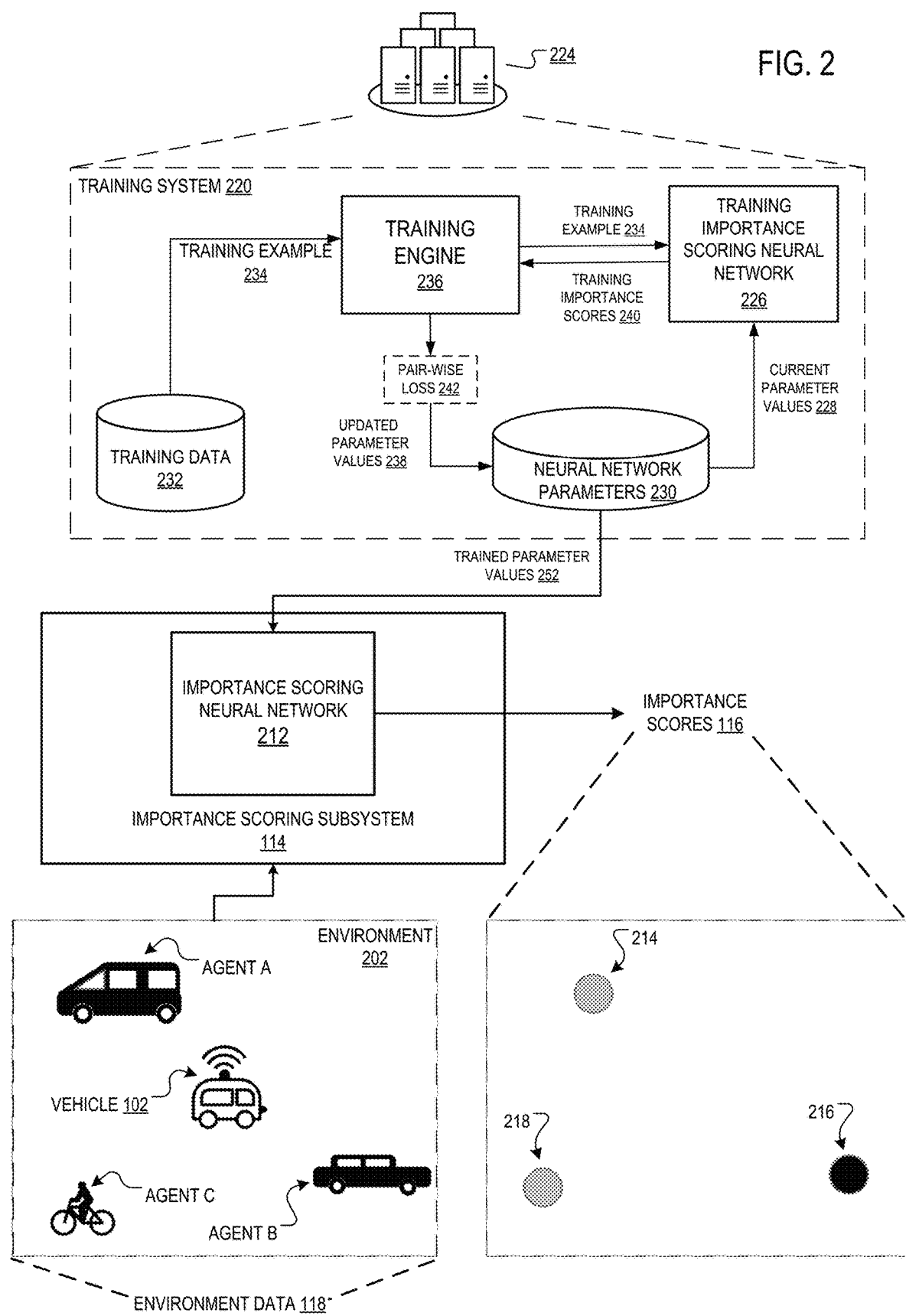
FIG. 2 is a block diagram of an example importance scoring subsystem and an example training system.

FIG. 2 is a block diagram of an example importance scoring subsystem 114 and an example training system 220. The importance scoring subsystem 114 and the training system 220 are examples of systems implemented as computer programs on one or more computers in one or more locations in which the systems, components, and techniques described below are implemented.

To allow the importance scoring subsystem 114 to accurately generate importance scores for the agents, the training system 220 can determine trained parameter values 252 of the importance scoring neural network 212 included in the importance scoring subsystem 114. While the subsystem 114 may be implemented on-board a vehicle as described above, the training system 220 is typically hosted within a data center 224, which can be a distributed computing system having hundreds or thousands of computers in one or more locations.

The training system 220 includes a training importance scoring neural network 226 that is configured to process an input that includes data describing the agents that are present in the environment in the vicinity of a vehicle and to generate an output that defines corresponding importance scores 240 for the agents. The training system 220 includes one or more computing devices having software or hardware modules that implement the operations of the training importance scoring neural network 226. For example, the training system 220 can include one or more computing devices having software or hardware modules that implement the respective operations of each layer of the training importance scoring neural network 226 according to an architecture of the training importance scoring neural network 226. The training importance scoring neural network 226 is generally the same network (or almost the same network) as the on-board importance scoring neural network 212. That is, the training importance scoring neural network 226 generally has (at least partially) the same architecture as the on-board importance scoring neural network 212 included in the importance scoring subsystem 114.

At any given time during the training, the training importance scoring neural network 226 can compute the operations of the training importance scoring model 226 using current values of parameters 228 stored in a collection of neural network parameters 230. Although illustrated as being logically separated, the neural network parameters 230 and the software or hardware modules performing the operations may actually be located on the same computing device or on the same memory device.

The training system 220 trains the training importance scoring neural network 226 using a training data set 232 which includes multiple training examples 234. The training examples 234 may be obtained from data that is derived from real or simulated driving logs. A real driving log stores the raw sensor data that is continually generated by the perception subsystem 104 onboard the vehicle 102 as the vehicle navigates through real-world environments. As described with reference to FIG. 1, the raw sensor data may be captured by one or more sensors of the vehicle, including one or more of: laser sensors, radar sensors, and camera sensors. A simulated driving log stores simulated sensor data. Simulated sensor data is generated by a software simulation of the environment. That is, the simulated sensor data simulates sensor data that would be generated by sensors of a vehicle.

Typically, each of the training examples 234 may include: (i) a training input that includes data describing the agents that are present in the environment, and (ii) a corresponding ground truth output that assigns a respective ground truth importance score to each of the agents. An example process for training the training importance scoring neural network is described with reference to FIG. 3.

In brief, the training importance scoring neural network 226 can process the inputs from the training examples 234 to generate, in accordance with the current parameter values 228 and for each training example 234, a training output which assigns respective training importance scores 240 to the agents that are present in the environment. For example, the training importance scoring subsystem 226 may generate a training output that includes an output channel represented as a 2D array of data values. In this example, each location in the output channel corresponds to a respective spatial position in the environment. For each spatial position in the environment that is occupied by an agent, the location in the output channel that corresponds to the spatial position defines a training importance score 240 for the agent.

A training engine 236 compares the training importance scores 240 to the ground truth importance scores included in the training example 234. The training engine 236 can compute, for each pair of selected locations in the training output, a loss function that characterizes discrepancies between the training importance scores 240 and the ground truth importance scores included in the training example 234.

In some implementations, the training engine 236 computes the loss function as a pair-wise loss 242, which is defined on the basis of pairs of selected locations whose ground truth importance scores are different. A pair-wise loss 242 is typically greater in magnitude if the relative order of the training importance scores assigned to a pair of selected locations violates the relative order of the ground truth importance scores for the corresponding pair of selected locations.

Specifically, if (i) a first training importance score at a first location in the pair is greater than a second training importance scores at a second location in the pair and (ii) a first ground truth importance score at the first location in the pair is greater than a second ground truth importance score at the second location in the pair, then the pair-wise loss 242 is smaller in magnitude than if the first ground truth importance score at the first location in the pair were less than the second ground truth importance score at the second location in the pair. In such cases, the pair-wise loss 242 can have a small magnitude, i.e., can be computed to be zero (or near-zero).

On the other hand, if (i) the first training importance score at the first location in the pair is less than the second training importance score at the second location in the pair but (ii) the first ground truth importance score at the first location in the pair is greater than the second ground truth importance score at the second location in the pair, then the pair-wise loss 242 is greater in magnitude than if the first ground truth importance score at the first location in the pair were less than the second ground truth importance score at the second location in the pair.

It should be noted that the computation of pair-wise loss is commutative, i.e., changing the order of the comparisons does not change the result. Therefore, the condition above can also be stated as: (i) the first training importance score at the first location in the pair is greater than the second training importance score at the second location in the pair but (ii) the first ground truth importance score at the first location in the pair is less than the second ground truth importance score at the second location in the pair, then the pair-wise loss 242 is greater in magnitude than if the first ground truth importance score at the first location in the pair were greater than the second ground truth importance score at the second location in the pair.

In a particular example, the pair-wise loss for a pair of locations i and j is defined as:

$\log(1+e^{s_j-s_i})$ if $l_i > l_j$, and
0 if $l_i \leq l_j$.

As another particular example, the pair-wise loss is defined as:

$\max(0, 1-(s_i-s_j))$ if $l_i > l_j$, and
0 if $l_i \leq l_j$.

As yet another particular example, the pair-wise loss is defined as:

$1-1/(1+e^{s_j-s_i})$ if $l_i > l_j$, and
0 if $l_i \leq l_j$.

Specifically, in the examples above, $l_i$ and are ground truth importance scores, and $s_i$ and $s_1$ are training importance scores.

The training engine 236 uses a computed gradient of the combined pairwise losses 242 to generate updated neural network parameter values 238. The training engine 236 generates updated neural network parameter values 238 by using an appropriate machine learning optimization technique (e.g., stochastic gradient descent). The training engine 236 can then update the collection of neural network parameters 230 using the updated parameter values 238.

After training is complete, the training system 220 can provide a set of trained parameter values 252 to the on-board system 100, e.g., by a wired or wireless connection. In particular, the training system 220 provides the trained parameter values 252 to the importance scoring neural network 212 included in the importance scoring subsystem 114 for use in generating importance scores that enable the generation of timely and accurate planning decisions by the planning subsystem 110 of FIG. 1.

As a particular example, the importance scoring subsystem 114 receives an environment data 118. The environment data 118 characterizes a scene of the environment 202 including the vehicle 102 and three agents—minivan denoted by Agent A, a sedan denoted by Agent B, and a bicyclist denoted by Agent C. Both the vehicle 102 and Agent B are heading towards the right, while Agent A and C are heading towards the left. The subsystem 114 processes the received environment data 118 using the importance scoring neural network 212 and in accordance with trained values of the network parameters to generate an output. The output defines respective importance scores 116 for each of the three agents. In this particular example, the locations 216 in the output correspond to Agent B in the input environment 202 and have importance score 9. The locations 214 and 218 in the output correspond to Agent A and C in the environment 202, respectively. Both locations 214 and 218 have importance score 3. In some cases, the subsystem 114 assigns importance score zero (or near-zero) to all remaining locations in the output that correspond to the background (e.g., ground, pavement, etc.) in the input environment 202. Referring back to FIG. 1, upon receiving the generated importance scores 116, the on-board system 100 can determine that Agent B (located in a direction towards which the vehicle 102 is traveling) has the highest impact on planning decisions generated by the planning subsystem 110 which plans a future trajectory of the vehicle 102.

Figure 3:
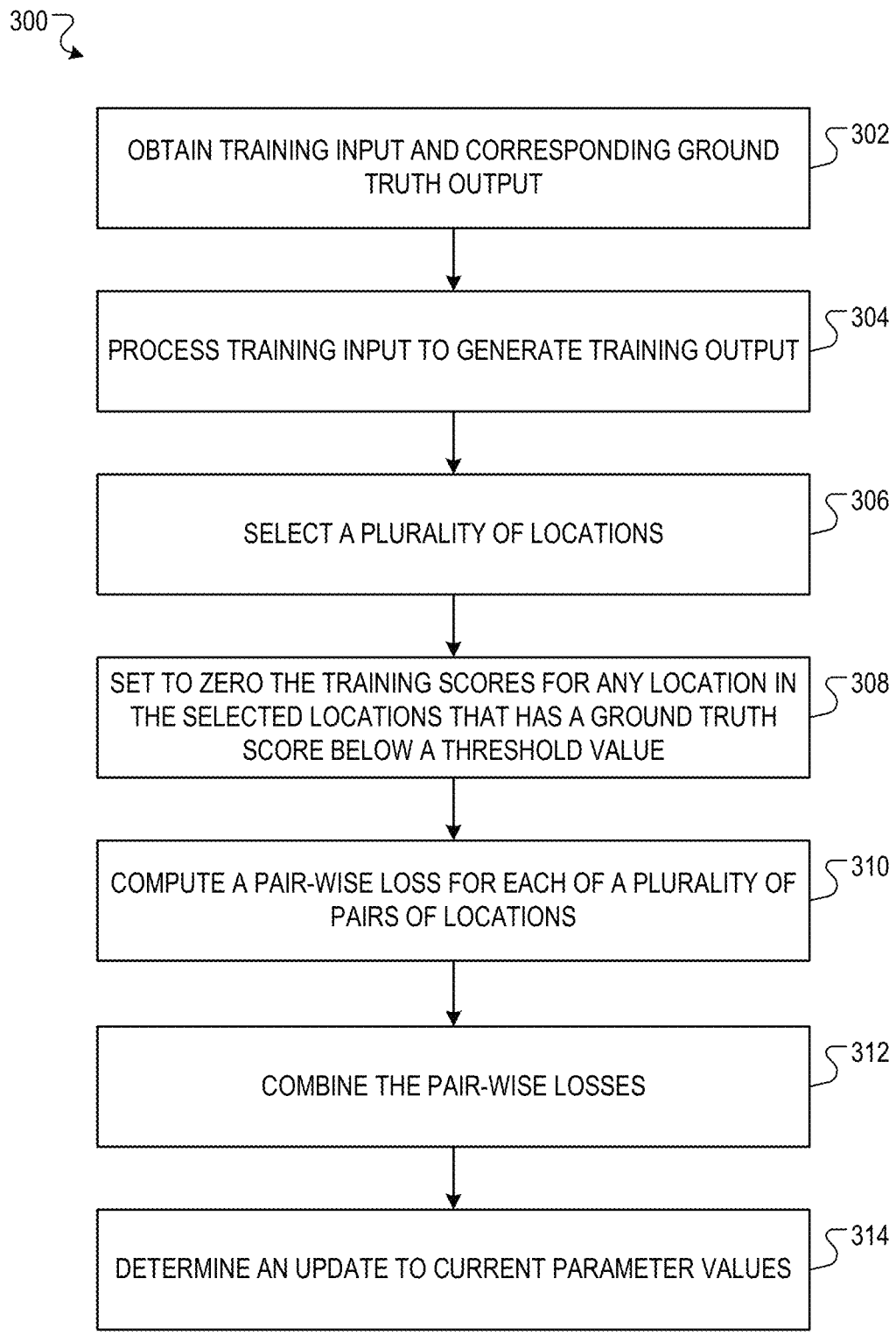
FIG. 3 is a flow diagram of an example process for training an importance scoring neural network.

FIG. 3 is a flow diagram of an example process 300 for training an importance scoring neural network. For convenience, the process 300 will be described as being performed by a system of one or more computers located in one or more locations. For example, a training system, e.g., the training system 220 of FIG. 2, appropriately programmed in accordance with this specification, can perform the process 300.

The system can repeatedly perform the process 300 for different training examples that each include a training input and a corresponding ground truth output in order to train the importance scoring neural network by repeatedly updating the values of the network parameters.

The system obtains a training input and a corresponding ground truth output (302). The training input includes data that describes the agents present in an environment in the vicinity of a vehicle. The corresponding ground truth output includes data defining respective ground truth importance scores assigned to each of the plurality of locations in the training input.

The system may obtain the training input from a training data set which is stored in a physical data storage device or a logical data storage area. The training input may be obtained from data that is derived from real or simulated driving logs. A real driving log stores the raw sensor data that is continually generated by the perception subsystem onboard the vehicle as the vehicle navigates through real-world environments. As described with reference to FIG. 1, the raw sensor data may be captured by one or more sensors of the vehicle, including one or more of: laser sensors, radar sensors, and camera sensors. A simulated driving log stores simulated sensor data. Simulated sensor data is generated by a software simulation of the environment. That is, the simulated sensor data simulates sensor data that would be generated by sensors of a vehicle.

The system processes the training input to generate a training output (304). In particular, the system processes the training input using the neural network and in accordance with current values of the network parameters to generate a training output including data that specifies a respective training importance score for each of the plurality of locations in the training input.

The system selects a plurality of candidate locations (306). In some implementations, the system selects all of the plurality of locations included in the training input. Alternatively, the system selects a fixed subset (e.g., 100) of candidate locations that have the highest ground truth importance scores. In some implementations, the size of the fixed subset is determined to ensure that the fixed subset includes more locations than the number of agents that can typically be depicted in any given training input.

The system sets to zero the training importance scores for any location in the selected locations that has a ground truth importance score below a threshold value (308). In general, the threshold value is a customizable value such that the locations that have ground truth importance scores below the threshold value correspond to background spatial positions in the environment (e.g., ground, pavement, etc.). The background spatial positions are not occupied by any agents and are typically less important than the agents in the environment when generating planning decisions.

The system computes a pair-wise loss for each of a plurality of pairs of selected locations (310). In particular, the plurality of pairs of locations include all possible pairs of two different selected locations. For example, if 100 candidate locations are selected from step 306, then the system computes a total number of 4950 pair-wise losses.

For each pair of locations, the system identifies a relative order of respective training importance scores at a first location and a second location. Similarly, the system identifies a relative order of respective ground truth importance scores at the first location and the second location. The system then computes a loss based on determining whether the relative order of the training importance scores matches the relative order of the ground truth importance scores.

Note that from the previous step, by setting to zero the training importance scores for locations that correspond to background spatial positions, the system prevents any score comparisons related to such positions from affecting the training of importance scoring neural network. In other words, a pair-wise loss for a pair of locations involving such locations is typically computed to be zero (or near zero).

More specifically, the magnitude of the pair-wise loss is smaller if (i) a first training importance score at a first location in the pair is greater than a second training importance score at a second location in the pair and (ii) a first ground truth importance score at the first location in the pair is greater than a second ground truth importance score at the second location in the pair.

An example of how the pair-wise losses for the locations can be computed is shown in FIG. 4. In particular, FIG. 4 illustrates example training outputs and example ground truth outputs. Specifically, the outputs include output channels that are represented as a 4 by 4 array of data values, Image 402 depicts a first example training output that assigns an importance score 6 to location [0, 0] and an importance score 2 to location [3, 3]. Image 404 depicts a second example training output that assigns an importance score 2 to location [0, 0] and an importance score 3 to location [3, 3]. Image 406 depicts the ground truth output that assigns an importance score 1 to location [0, 0] and an importance score 9 to location [3, 3].

Referring now to FIG. 4 images 404 and 406, as a particular example, location [3, 3] is designated as the first location and location [0, 0] is designated as the second location. The system compares the relative orders of the training importance scores as depicted in image 404 with the relative orders of the ground truth importance scores as depicted in image 406. In this example, (i) a first training importance score 3 at the first location [3, 3] is greater than a second training importance score 2 at the second location [0, 0] and (ii) a first ground truth importance score 9 at the first location [3, 3] is greater than a second ground truth importance score 1 at the second location [0, 0]. Therefore, the system determines that the relative order of the training importance scores matches the relative order of the ground truth importance scores. While the training importance scores does not exactly match the ground truth importance scores, the system determines a comparatively small loss for the pair of locations [3, 3] and [0, 0].

On the other hand, the magnitude of the pair-wise loss is greater if (i) the first training importance score at the first location in the pair is less than the second training importance score at the second location in the pair but (ii) the first ground truth importance score at the first location in the pair is greater than the second ground truth importance score at the second location in the pair.

Referring to FIG. 4 images 402 and 406, as another particular example, location [3, 3] is designated as the first location and location [0, 0] is designated as the second location. The system compares the relative orders of the training importance scores as depicted in image 402 with the relative orders of the ground truth importance scores as depicted in image 406. In this example, (i) a first training importance score 2 at the first location [3, 3] is less than the second training importance score 6 at the second location [0, 0] but (ii) the first ground truth importance score 9 at the first location [3, 3] is greater than the second ground truth importance score 1 at the second location [0.0]. Therefore, the system determines that the relative order of the training importance scores violates the relative order of the ground truth importance scores. The system then determines a comparatively large loss for the pair of locations [3, 3] and [0, 0]. In some implementations, the magnitude of the comparatively large loss can be 10 times or 100 times as much as the magnitude of the comparatively small loss.

The system combines the pair-wise losses (312). In some implementations, the system computes a sum of all pair-wise losses. Alternatively, the system computes an average of all pair-wise losses.

The system determines an update to current parameter values of the network (314) by determining a gradient of the combined pair-wise loss with respect to the network parameters.

The system then proceeds to update the current parameter values based on the gradient using an appropriate machine learning training technique (e.g., stochastic gradient descent). Alternatively, the system only proceeds to update the current parameter values once the process 300 has been performed for an entire mini-batch of training examples. A mini-batch generally includes a fixed number of training examples, e.g., 16, 64, or 256. In other words, the system combines respective gradients that are determined during the fixed number of iterations of process 300 and proceeds to update the current parameter values based on the combined gradient.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of network parameters and configured to receive a network input and to process the network input in accordance with the network parameters to generate a network output that assigns a respective score to each of a plurality of locations in the network input, the method comprising:
   obtaining a training input and a corresponding ground truth output that assigns a respective ground truth score for each of the plurality of locations in the training input, wherein the plurality of locations in the training input include corresponding locations of one or more agents that are in an environment within a vicinity of a vehicle, and wherein the respective ground truth scores include a respective importance score for each of the one or more agents;
   processing the training input using the neural network and in accordance with current values of the network parameters to generate a training output that assigns a respective training score to each of the plurality of locations in the training input;
   computing a loss for the training input, comprising:
      selecting a plurality of candidate locations from the plurality of locations;
      setting to zero the training scores for any location in the selected candidate locations that has a ground truth score below a threshold value;
      for each of a plurality of pairs of locations in the selected candidate locations:
         computing a pair-wise loss for the pair based on the ground truth scores and the training scores for the pair of locations; and
      combining the pair-wise losses for the pairs of locations to compute the loss for the training input; and determining an update to the current values of the parameters by determining a gradient of the loss with respect to the network parameters.

2. The method of claim 1, wherein if (i) a first training score at a first location in the pair is greater than a second training scores at a second location in the pair and (ii) a first ground truth score at the first location in the pair is greater than a second ground truth score at the second location in the pair, then the pair-wise loss is smaller in magnitude than if the first ground truth score at the first location in the pair were less than the second ground truth score at the second location in the pair.

3. The method of claim 2, wherein if (i) the first training score at the first location in the pair is less than the second training score at the second location in the pair but (ii) the first ground truth score at the first location in the pair is greater than the second ground truth score at the second location in the pair, then the pair-wise loss is greater in magnitude than if the first ground truth score at the first location in the pair were less than the second ground truth score at the second location in the pair.

4. The method of claim 1, wherein the last layer of the neural network is a layer that is configured to only generate output scores that are greater than or equal to zero.

5. The method of claim 1, wherein the importance score for an agent characterizes an estimated impact of the agent on planning decisions generated by a planning subsystem of the vehicle which plans a future trajectory of the vehicle.

6. The method of claim 1, wherein combining the pair-wise losses comprises computing a sum of all pair-wise losses.

7. The method of claim 1, wherein combining the pair-wise losses comprises computing an average of all pair-wise losses.

8. The method of claim 1, wherein selecting a plurality of candidate locations comprises selecting a fixed size subset of candidate locations that have the highest ground truth scores.

9. The method of claim 1, wherein the plurality of pairs of locations comprise all possible pairs of two different selected candidate locations.

10. A system comprising:
one or more computers; and
one or more storage devices communicatively coupled to the one or more computers, wherein the one or more storage devices store instructions that, when executed by the one or more computers, cause the one or more computers to perform operations for training a neural network having a plurality of network parameters and configured to receive a network input and to process the network input in accordance with the network parameters to generate a network output that assigns a respective score to each of a plurality of locations in the network input, the operations comprising:
obtaining a training input and a corresponding ground truth output that assigns a respective ground truth score for each of the plurality of locations in the training input, wherein the plurality of locations in the training input include corresponding locations of one or more agents that are in an environment within a vicinity of a vehicle, and wherein the respective ground truth scores include a respective importance score for each of the one or more agents;
processing the training input using the neural network and in accordance with current values of the network parameters to generate a training output that assigns a respective training score to each of the plurality of locations in the training input;
computing a loss for the training input, comprising:
selecting a plurality of candidate locations from the plurality of locations;
setting to zero the training scores for any location in the selected candidate locations that has a ground truth score below a threshold value;
for each of a plurality of pairs of locations in the selected candidate locations:
computing a pair-wise loss for the pair based on the ground truth scores and the training scores for the pair of locations; and
combining the pair-wise losses for the pairs of locations to compute the loss for the training input; and
determining an update to the current values of the parameters by determining a gradient of the loss with respect to the network parameters.

11. The system of claim 10, wherein if (i) a first training score at a first location in the pair is greater than a second training scores at a second location in the pair and (ii) a first ground truth score at the first location in the pair is greater than a second ground truth score at the second location in the pair, then the pair-wise loss is smaller in magnitude than if the first ground truth score at the first location in the pair were less than the second ground truth score at the second location in the pair.

12. The system of claim 11, wherein if (i) the first training score at the first location in the pair is less than the second training score at the second location in the pair but (ii) the first ground truth score at the first location in the pair is greater than the second ground truth score at the second location in the pair, then the pair-wise loss is greater in magnitude than if the first ground truth score at the first location in the pair were less than the second ground truth score at the second location in the pair.

13. The system of claim 10, wherein the last layer of the neural network is a layer that is configured to only generate output scores that are greater than or equal to zero.

14. The system of claim 10, wherein the importance score for an agent characterizes an estimated impact of the agent on planning decisions generated by a planning subsystem of the vehicle which plans a future trajectory of the vehicle.

15. The system of claim 10, wherein combining the pair-wise losses comprises computing a sum of all pair-wise losses.

16. The system of claim 10, wherein combining the pair-wise losses comprises computing an average of all pair-wise losses.

17. The system of claim 10, wherein selecting a plurality of candidate locations comprises selecting a fixed size subset of candidate locations that have the highest ground truth scores.

18. One or more non-transitory computer storage media storing instructions that when executed by one or more computers cause the one or more computers to perform operations for training a neural network having a plurality of network parameters and configured to receive a network input and to process the network input in accordance with the network parameters to generate a network output that assigns a respective score to each of a plurality of locations in the network input, the operations comprising:
obtaining a training input and a corresponding ground truth output that assigns a respective ground truth score for each of the plurality of locations in the training input, wherein the plurality of locations in the training input include corresponding locations of one or more agents that are in an environment within a vicinity of a vehicle, and wherein the respective ground truth scores include a respective importance score for each of the one or more agents;

processing the training input using the neural network and in accordance with current values of the network parameters to generate a training output that assigns a respective training score to each of the plurality of locations in the training input;

computing a loss for the training input, comprising:
  selecting a plurality of candidate locations from the plurality of locations;
  setting to zero the training scores for any location in the selected candidate locations that has a ground truth score below a threshold value;
  for each of a plurality of pairs of locations in the selected candidate locations:
    computing a pair-wise loss for the pair based on the ground truth scores and the training scores for the pair of locations; and
  combining the pair-wise losses for the pairs of locations to compute the loss for the training input; and determining an update to the current values of the parameters by determining a gradient of the loss with respect to the network parameters.

* * * * *